Patented Jan. 18, 1949

2,459,761

UNITED STATES PATENT OFFICE 2,459,761

BUTADIENE-STYRENE COPOLYMER TACKIFIED WITH OXIDIZED ISOPRENE POLYMER

Henry F. Palmer, Akron, Ohio, assignor to The Firestone Tire & Rubber Company, Akron, Ohio, a corporation of Ohio No Drawing. Application October 25, 1946, Serial No. 705,817

2 Claims. (Cl. 260—45.5)

1

This invention relates to a rubber composition which is a synthetic rubber produced from butadiene and styrene which is made tacky by incorporation therein of an oxidized isoprene rubber. The isoprene rubber may be an isoprene polymer or a copolymer of isoprene and styrene, such as a copolymer produced from about 75 parts isoprene and 25 parts styrene.

The expression "isoprene rubber" is used herein to refer to rubbers made from isoprene and thus includes synthetic isoprene polymers while excluding natural rubber which, although a polymer of isoprene, has never been made from isoprene.

Natural rubber, when milled and compounded, possesses sufficient tack so that when extruded or applied to plies of fabric, the extruded products and plies will adhere to one another when pressed together. In the production of a tire, ponton, etc., from natural rubber, the various parts may be assembled by merely pressing one to the other, and when so assembled will adhere during subsequent handling and vulcanization. After vulcanization there is little danger of tread or ply separation. Unfortunately, the same techniques cannot be applied to the fabrication of articles from GR-S rubber (copolymers of butadient and styrene). This material lacks tack, and great difficulty has been encountered in trying to assemble the parts of a tire, etc., prior to vulcanization.

According to this invention tack is imparted to GR-S by incorporating in 100 parts of the GR-S a relatively small amount, for example, 10 to 25 parts of an oxidized isoprene rubber. The resultant formulations are quite tacky so that rubber products, such as tires, pontons, etc., may be assembled from components containing these formulations by merely pressing the parts together. The uncured product thus produced on subsequent vulcanization will form a coherent whole in which there is no great danger of separation of the plies, etc., such as is encountered in the tires, etc., produced from GR-S as ordinarily compounded.

The oxidized isoprene rubbers employed in the practice of this invention may be any of the sticky products produced by the oxidation of a rubbery polymer of isoprene or copolymer of at least about 75 parts of isoprene and up to about 25 parts of styrene (the parts being by weight). The oxidation may be effected in various ways; for instance, by intensive and prolonged mastication on a rubber mill in contact with air or oxygen, usually at high pressure, and preferably at

2 a somewhat elevated temperature on the order of 70–200° C. Alternatively, the material may be exposed in the form of sheets, ribbons or other configurations providing a large surface-volume ratio, to oxidizing gases at the said relatively high temperatures.

The oxidizing treatment may be carried out to various degrees; and, in general, it may be stated that a sufficient degree of oxidation for the purpose of this invention will have been achieved when the plasticity value of the isoprene rubber has been reduced to not more than 3.25 mm. (Williams Plastometer at 75° F. for 2 minutes). The treatment may be carried out to a still further extent, limiting consideration being the complete breakdown of the rubber to a semiliquid mass.

The oxidized isoprene rubber may be compounded with the GR-S according to any suitable formula. The GR-S and oxidized isoprene product may be milled together, or if a solution or cement is required, they may be dissolved in a common solvent. Vulcanizing agents, antioxidants, etc., may be incorporated in the rubber in the usual manner. A typical compound for tire construction is produced by milling together the following ingredients.

FORMULA

| | Parts by weight |
|---|---|
| GR-S | 85 |
| Oxidized isoprene rubber | 15 |
| Mercaptobenzothiazole | 1 |
| Di-o-tolylguanidine | 0.1 |
| Softeners | 10 |
| Zinc oxide | 4 |
| Sulfur | 3 |
| EPC black | 15 |
| HMF black | 30 |

Such a compound may be cured by heating 10 minutes at 290° F. or thereabouts.

The following procedures illustrate how the isoprene rubber may be oxidized. In each instance, particular reference is made to the use of an oxidized isoprene polymer although the same process may be employed with an isoprene-styrene copolymer. The oxidized isoprene rubbers obtained by the procedures described hereinbelow may be used in compounding according to the above formula.

Masticator methods

This procedure applies to oxidation in a closed mixer. Rubber-like isoprene polymer (or other isprene rubber) is first plasticated (plasticized by a Gordon Plasticator) or mill-massed to a specified plasticity—for example, a Mooney plasticity of about 35, using the large rotor and plasticizing for 4 minutes at 212° F. After a rest period of 12 hours, the milled product is creped on a 60-inch mill and removed in loose rolls. A batch of 350 pounds is charged to a horizontal double-bladed dough-type mixer equipped with a plunger and a steam jacket. A steam pressure of 30 pounds is used in the jacket throughout the entire cycle, and compressed air at about 40 pounds is forced under the plunger during the entire cycle in order to effect the oxidation. The speed of the machine is adjusted to the maximum possible below the safe load limit, and for this purpose a recording ammeter is attached to the motor. The mixture is continued until the plasticity of the material is reduced to a maximum of 3.25 mm. (Williams Plastometer at 75° F. for 2 minutes). This will usually require about 1¼ to 2 hours. The final temperature of the isoprene rubber will be about 275° to 300° F. The plunger is then raised and the mixing continued for another 15 minutes at top speed to remove excessive occluded air.

Oven method

Alternatively, the isoprene rubber which has been plasticated or massed as above described is remilled—for example, 325 pounds of rubber on an 84-inch mill for 20 minutes—and sheeted off in a sheet with a thickness of no more than ¼ inch. These sheets are placed in pans and heated 10 to 12 hours in an air oven at 220–230° F. to effect oxidation.

The sticky oxidized isoprene rubber produced by either of the above methods is compounded with the GR-S according to a desired formula, such as the above, and the compounded rubber is then used in building up rubber products in the manner in which natural rubber has been used in the past.

Modifications may be made in the specific disclosure without departing from the invention which is defined in the appended claims.

What I claim is:

1. The method of imparting tack to a rubbery copolymer of butadiene and styrene which comprises incorporating in 75 to 90 parts of the unvulcanized copolymer about 25 to 10 parts of unvulcanized, sticky, oxidized synthetic rubbery copolymer of 75 parts of isoprene and 25 parts of styrene.

2. Uncured, tacky rubber compound which contains essentially 75 to 90 parts of rubbery copolymer of butadiene and styrene and 25 to 10 parts of unvulcanized, sticky, oxidized synthetic rubbery copolymer of 75 parts of isoprene and 25 parts of styrene.

HENRY F. PALMER.

REFERENCES CITED

The following references are of record in the file of this patent:

UNITED STATES PATENTS

| Number | Name | Date |
| --- | --- | --- |
| 2,035,698 | Fisher | Mar. 21, 1936 |
| 2,201,273 | Schoenfeld | Mar. 21, 1940 |
| 2,264,509 | Copper | Dec. 2, 1941 |

OTHER REFERENCES

Warden, India Rubber World, Jan. 1945 (pp. 432–435).

Josefowitz, India Rubber World, Apr. 1, 1942 (pp. 33–37.)

Barron "Modern Synthetic Rubbers," pp. 181, 182, 196, published by D. Van Nostrand Co., N. Y., 1944 (copy in Div. 50).

Morris, India Rubber World, Nov. 1943 (pp. 150–152 and 192).

Continental Carbon Co., Akron, Ohio, Report GRS, No. 4, Oct. 1, 1943 (copy in Division 50) (7pp.).

Rubber Age, Feb. 1946, page 613.

Certificate of Correction

Patent No. 2,459,761. January 18, 1949.

HENRY F. PALMER

It is hereby certified that errors appear in the printed specification of the above numbered patent requiring correction as follows:

Column 2, line 51, for the heading "Masticator methods" read *Masticator method*; line 55, for "isprene" read *isoprene*; column 3, line 16, for the word "mixture" read *mixing*; column 4, line 25, list of references cited, for "Mar. 21, 1936" read *Mar. 31, 1936*; line 27, for "Copper" read *Cooper*;

and that the said Letters Patent should be read with these corrections therein that the same may conform to the record of the case in the Patent Office.

Signed and sealed this 23rd day of August, A. D. 1949.

[SEAL]

THOMAS F. MURPHY,
*Assistant Commissioner of Patents.*